(12) United States Patent
Tokuchi

(10) Patent No.: US 10,694,070 B2
(45) Date of Patent: Jun. 23, 2020

(54) INFORMATION PROCESSING APPARATUS, DATA STRUCTURE OF IMAGE FILE, AND NON-TRANSITORY COMPUTER READABLE MEDIUM FOR MANAGING USAGE MODE OF IMAGE

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/935,062

(22) Filed: Mar. 26, 2018

(65) Prior Publication Data

US 2019/0079716 A1    Mar. 14, 2019

(30) Foreign Application Priority Data

Sep. 13, 2017   (JP) ................. 2017-176004

(51) Int. Cl.
*G06F 3/12* (2006.01)
*H04N 1/00* (2006.01)
*G06Q 30/02* (2012.01)
*H04N 1/34* (2006.01)
*G06F 16/21* (2019.01)
*G06F 21/10* (2013.01)

(52) U.S. Cl.
CPC ........... *H04N 1/342* (2013.01); *G06F 3/1207* (2013.01); *G06F 3/1259* (2013.01); *G06F 3/1287* (2013.01); *G06F 16/219* (2019.01); *G06F 21/10* (2013.01); *G06Q 30/0283* (2013.01); *H04N 1/00143* (2013.01); *H04N 1/00323* (2013.01); *G06Q 2220/12* (2013.01)

(58) Field of Classification Search
CPC ............... H04N 1/342; H04N 1/00143; H04N 1/00323; G06F 16/219; G06F 3/1259; G06F 3/1287; G06F 21/10; G06Q 30/0283; G06Q 2220/12
See application file for complete search history.

(56) References Cited

U.S. PATENT DOCUMENTS

| 2002/0021304 | A1 | 2/2002 | Eguchi | |
| 2003/0191719 | A1* | 10/2003 | Ginter | ............ G06F 21/10 705/54 |
| 2005/0073594 | A1 | 4/2005 | Tagawa | |
| 2010/0231949 | A1* | 9/2010 | Mori | ............ G06F 21/121 358/1.14 |

FOREIGN PATENT DOCUMENTS

| JP | 2002-132558 | 5/2002 |
| JP | 2004-120069 | 4/2004 |

* cited by examiner

*Primary Examiner* — Quang N Vo
(74) *Attorney, Agent, or Firm* — JCIPRNET

(57) ABSTRACT

An information processing apparatus includes a receiver and a transmitter. The receiver receives an image associated with attribute information. When detecting a use of the image, the transmitter transmits information related to the use of the image. In a further modification of the invention, the image may be an image corresponding to an object.

12 Claims, 20 Drawing Sheets

FIG.6

USE HISTORY OF CHARACTER 20

| No. 601 | DATE AND TIME 602 | USED DEVICE 603 | USER 604 | CONTENT OF USE 605 | CHARGE 606 |
|---|---|---|---|---|---|
| 1 | 2017/05/07 23:00:00 | ABC111111 | MR. M | DOWNLOAD | US$1.00 |
| 2 | 2017/05/07 23:01:35 | XYZ000000 | MR. N | DUPLICATION | US$0.50 |
| 3 | 2017/05/07 23:15:04 | XYZ000000 | MR. N | MODIFICATION | US$1.00 |

USE HISTORY OF GROUP 50 — 600D

| No. 601 | DATE AND TIME 602 | USED DEVICE 603 | USER 604 | CONTENT OF USE 605 | CHARGE 606 |
|---|---|---|---|---|---|
| 1 | 2017/05/07 23:00:00 | ABC111111 | MR. M | DOWNLOAD | US$1.00 |
| 2 | 2017/05/07 23:01:35 | XYZ000000 | MR. N | DUPLICATION | US$0.50 |
| 3 | 2017/05/07 23:15:04 | XYZ000000 | MR. N | MODIFICATION | US$1.00 |

INFORMATION PROCESSING APPARATUS, DATA STRUCTURE OF IMAGE FILE, AND NON-TRANSITORY COMPUTER READABLE MEDIUM FOR MANAGING USAGE MODE OF IMAGE

CROSS-REFERENCE TO RELATED APPLICATIONS

This application is based on and claims priority under 35 USC 119 from Japanese Patent Application No. 2017-176004 filed Sep. 13, 2017.

BACKGROUND

(i) Technical Field

The present invention relates to an information processing apparatus, a data structure of an image file, and a non-transitory computer readable medium.

(ii) Related Art

The Joint Photographic Experts Group (JPEG) format allows to describe metadata such as shooting date and a creator as attribute information.

SUMMARY

According to an aspect of the invention, an information processing apparatus includes a receiver and a transmitter. The receiver receives an image associated with attribute information. When detecting a use of the image, the transmitter transmits information related to the use of the image.

BRIEF DESCRIPTION OF THE DRAWINGS

Exemplary embodiments of the present invention will be described in detail based on the following figures, wherein:

FIG. 6 is a view for explaining an example of use history data managed by a content server;

FIG. 12 is a view for explaining an example of use history data prepared for each group in the content server;

FIGS. 20A and 20B are views for explaining writing of information that defines the workflow process into attribute information, in which FIG. 20A illustrates a data structure before the information is included in the attribute information of an JPEG file, and FIG. 20B illustrates a state in which the information is added to the attribute information of the JPEG file.

DETAILED DESCRIPTION

Hereinafter, exemplary embodiments of the present invention will be described with reference to the accompanying drawings.

First Exemplary Embodiment

In the present exemplary embodiment, a description will be made of a case where data of an image corresponding to an object is given as a JPEG file in compliance with the JPEG format. In particular, data of the image corresponding to the object may be given as an image file in compliance with another format.

Further, in the present exemplary embodiment, a description has been made of a case of using a JPEG file which is an example of a still image file. Alternatively, a moving image file in compliance with the moving picture experts group (MPEG) format or the like may also be used.

<Data Structure of JPEG File>

Figure 1:
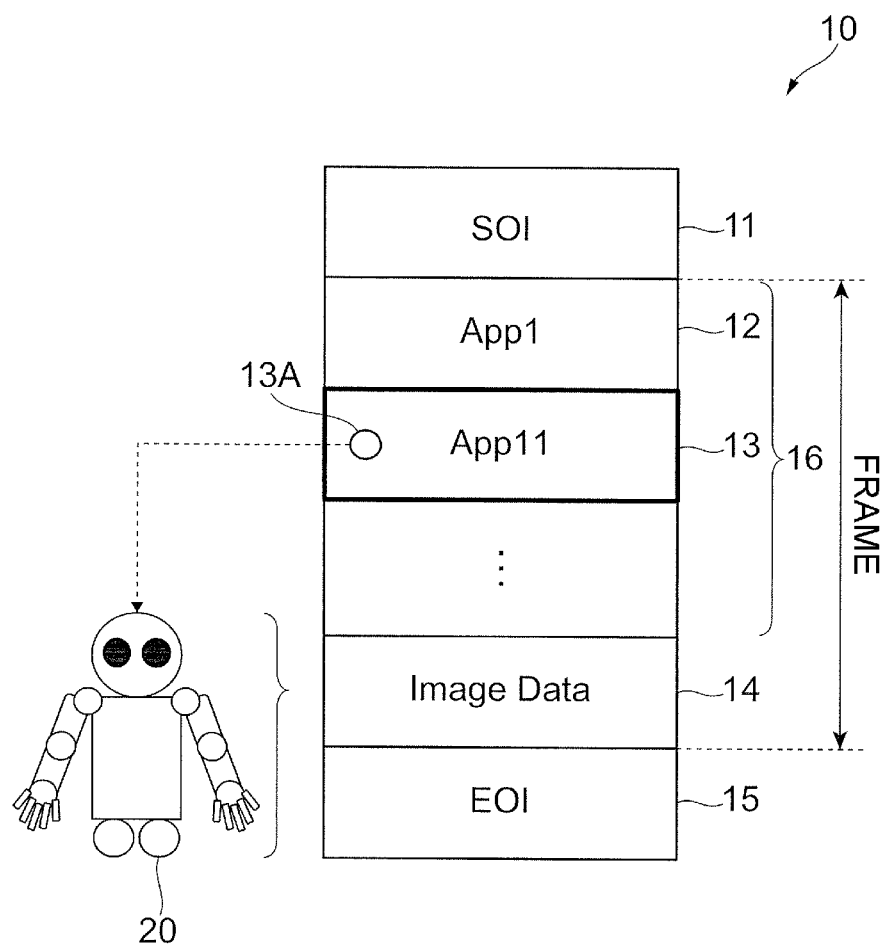
FIG. 1 is a view illustrating a data structure of a JPEG file used in a first exemplary embodiment.

FIG. 1 is a view illustrating a data structure of a JPEG file 10 used in a first exemplary embodiment.

The JPEG file 10 includes: a start of image segment (SOI) 11 indicating a start position of an image; an application type 1 segment (App1) 12 used in the description of Exif information or the like; an application type 11 segment (App11) 13 that is a type of an extended region; image data (ID) 14; and an end of image segment (EOI) 15 indicating an end position of the image.

The pixel value of each pixel constituting the image is recorded in the image data 14.

In the image data 14 in FIG. 1, the pixel value of each pixel constituting a robot type character 20 is recorded. Here, the character 20 is an example of an object. Therefore, the image data 14 is data of an image corresponding to the character 20. Further, in the present exemplary embodiment, an object is used to mean a region that is treated as a processing target distinguished from other regions. The object is not limited to an image called a so-called character, but may be an image of a whole or a portion of a captured range such as a photograph. For example, the object may be a portion of a character.

In the present exemplary embodiment, the image data 14 is given as a color image, but may be given as a grayscale image. The region where the image data 14 is stored is an example of a first data region.

The region interposed between the start of image segment 11 and the end of image segment 15 is also called a frame.

Although not illustrated in FIG. 1, the JPEG file 10 also includes two segments (not illustrated), that is, a define quantization table segment (DQT) and a define Huffman table segment (DHT). Segments other than these are disposed as required.

The application type 1 segment 12 and the application type 11 segment 13 are portions of the attribute information 16 of the JPEG file 10.

Here, the attribute information 16 refers to various pieces of information related to the image, and includes, for example, the size of the image, the size of the data, information related to the object, link information, and the like.

In the present exemplary embodiment, information 13A which is associated with the image data 14 corresponding to the character 20 is recorded in the application type 11 segment 13. Further, the information 13A may be associated with a partial region of the image data 14.

In the information 13A in the present exemplary embodiment, information is recorded which defines a workflow process to be executed by an information processing apparatus (for example, computer) which uses the JPEG file 10. Information related to a use of the image corresponding to the character 20 is transmitted through execution of the workflow process.

The information related to the use of the image corresponding to the character 20 includes a fact that a user uses the image, a date and time of the use, the content of the use (usage mode), and the like. Here, examples of the content of the use (usage mode) include downloading, displaying, duplicating, modifying (editing), printing, recording, transmitting, distributing, broadcasting, and the like.

The information 13A in the present exemplary embodiment is described in the text format. In the present exemplary embodiment, for example, a Java Script Object Notation (JSON), which is an example of a data exchange format, is used as the text format. The JSON (registered trademark) is a language that uses a portion of the object notation in JavaScript (registered trademark) as a syntax base. Of course, the language used to describe the workflow process is not limited to the JSON.

Plural pieces of information 13A may be recorded for one object. For example, two pieces of information 13A may be recorded for one object. In particular, the information 13A may not be recorded for an object that does not need to manage a use history.

In the example of FIG. 1, one piece of information 13A is associated with the character 20 as an object, but two pieces of information 13A may be associated with the character 20.

In this case, one of the two pieces of information 13A is a description of the workflow process corresponding to a first language (for example, Japanese, for a first OS), and the other is a description of the workflow process corresponding to a second language (for example, English, for a second OS). The language in which the workflow process is to be executed, for example, may be designated by the user through a selection screen.

Further, the contents of the workflow process defined by the two pieces of information 13A may be different from each other. For example, one of the two pieces of information 13A may be a description of the workflow process for controlling the transmission of the information related to the use of the character 20 as an object, whereas the other may be a description of the workflow process for controlling the operation of a real article corresponding to the character 20 from a remote place.

The workflow process according to the present exemplary embodiment is defined as a combination of plural processes such as acquiring information, storing information, displaying information, and transmitting information.

The region that stores the attribute information 16 in which the information 13A is recorded is an example of a second data region.

<Configuration of Image Processing System>

Figure 2:
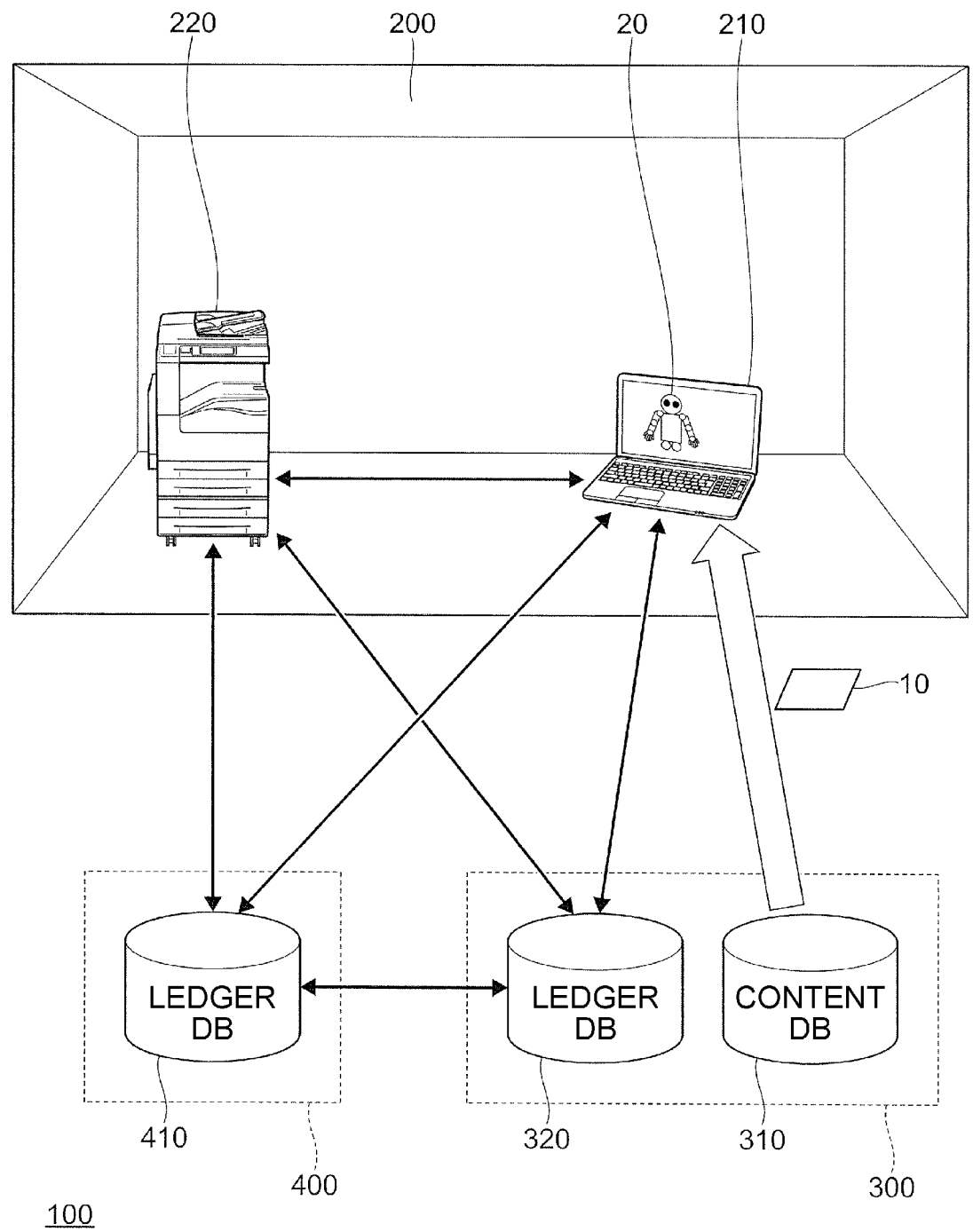
FIG. 2 is a view illustrating a configuration example of an image processing system according to the first exemplary embodiment.

FIG. 2 is a view illustrating a configuration example of an image processing system 100 according to the first exemplary embodiment.

The image processing system 100 includes a local area network (LAN) 200 in which the JPEG file 10 corresponding to the character 20 is used, a content server 300 that distributes the JPEG file 10, and a management server 400 that manages a ledger database 410.

In the present exemplary embodiment, for example, an individual housing is assumed as the local area network 200. The local area network 200 includes a computer 210 that downloads the JPEG file 10 and an image forming apparatus 220 that forms an image of the character 20 on a recording material (for example, a sheet of paper). The image forming apparatus 220 illustrated in FIG. 2 has not only a function of forming an image on a recording material, but also a function of reading an image from a document.

The computer 210 and the image forming apparatus 220 are examples of an information processing apparatus.

The computer 210 in the present exemplary embodiment is not limited to a laptop computer, but may be a tablet computer, a smart phone, a mobile phone, a camera, a portable game machine, or the like.

In the present exemplary embodiment, the computer 210, the image forming apparatus 220, the content server 300, and the management server 400 are collectively referred to as terminals.

Figure 3:
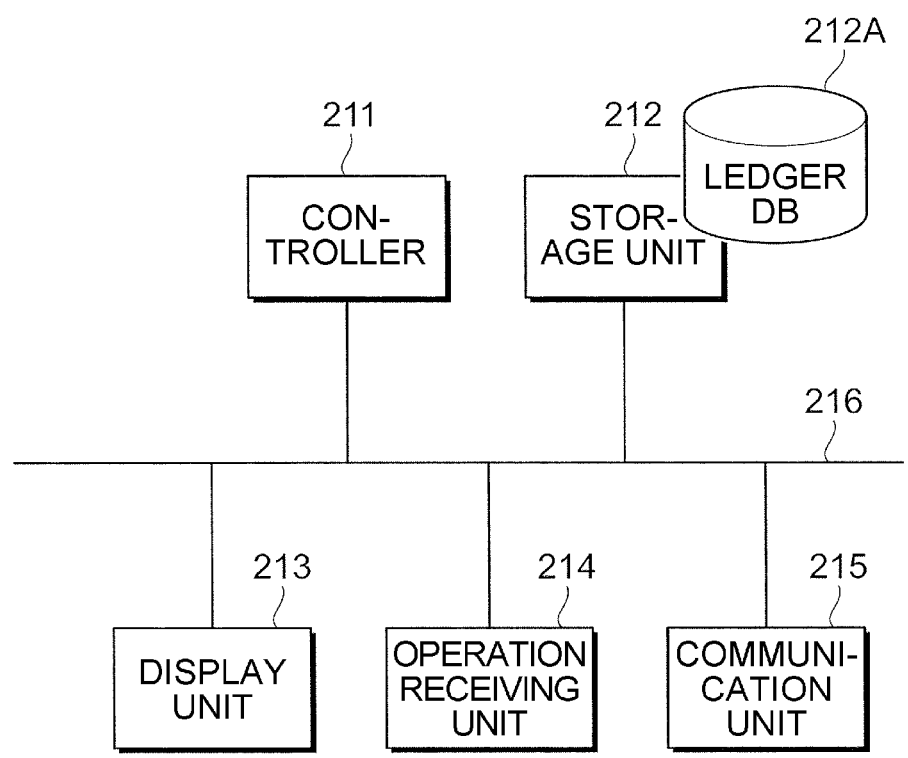
FIG. 3 is a view illustrating an example of a hardware configuration of a computer.

FIG. 3 is a view illustrating an example of a hardware configuration of the computer 210.

The computer 210 includes a controller 211 that controls the entire apparatus, a storage unit 212 used for storing the JPEG file 10 and the like, a display unit 213 used for displaying an image, an operation receiving unit 214 that receives a user's operation, and a communication unit 215 used for communication with an external device.

The controller 211 and each unit are connected to each other via a bus 216.

The controller 211 is an example of a controller, and is configured with a central processing unit (CPU), a read only memory (ROM), and a random access memory (RAM). The ROM stores a basic input/output system (BIOS) and an operation system (OS) executed by the CPU. The RAM is used as a work area of a program. The controller 211 also executes a workflow process defined by the above-described information 13A (see FIG. 1) through execution of the program.

The storage unit 212 is configured with a storage device such as a hard disk device or a semiconductor memory. In addition to the JPEG file 10, information related to a use history of the object (ledger database 212A) is also recorded in the storage unit 212 according to the present exemplary embodiment.

The display unit 213 is a display device that displays various images. The display unit 213 is configured with, for example, a liquid crystal display panel or an organic electro luminescence (EL) display panel.

The operation receiving unit 214 is a device that receives an operation from the user, and includes, for example, a keyboard, a button, a switch, a touch pad, a touch panel, and the like.

The communication unit 215 includes, for example, a LAN interface and an Internet of Things (IOT) interface, and communicates with other devices existing on the network in a peer-to-peer manner. The communication unit 215 is an example of a communication unit. For example, an Ethernet (registered trademark) interface, WiFi (registered trademark), Bluetooth (registered trademark), ZigBee (registered trademark), or the like is used for the communication described here.

Figure 4:
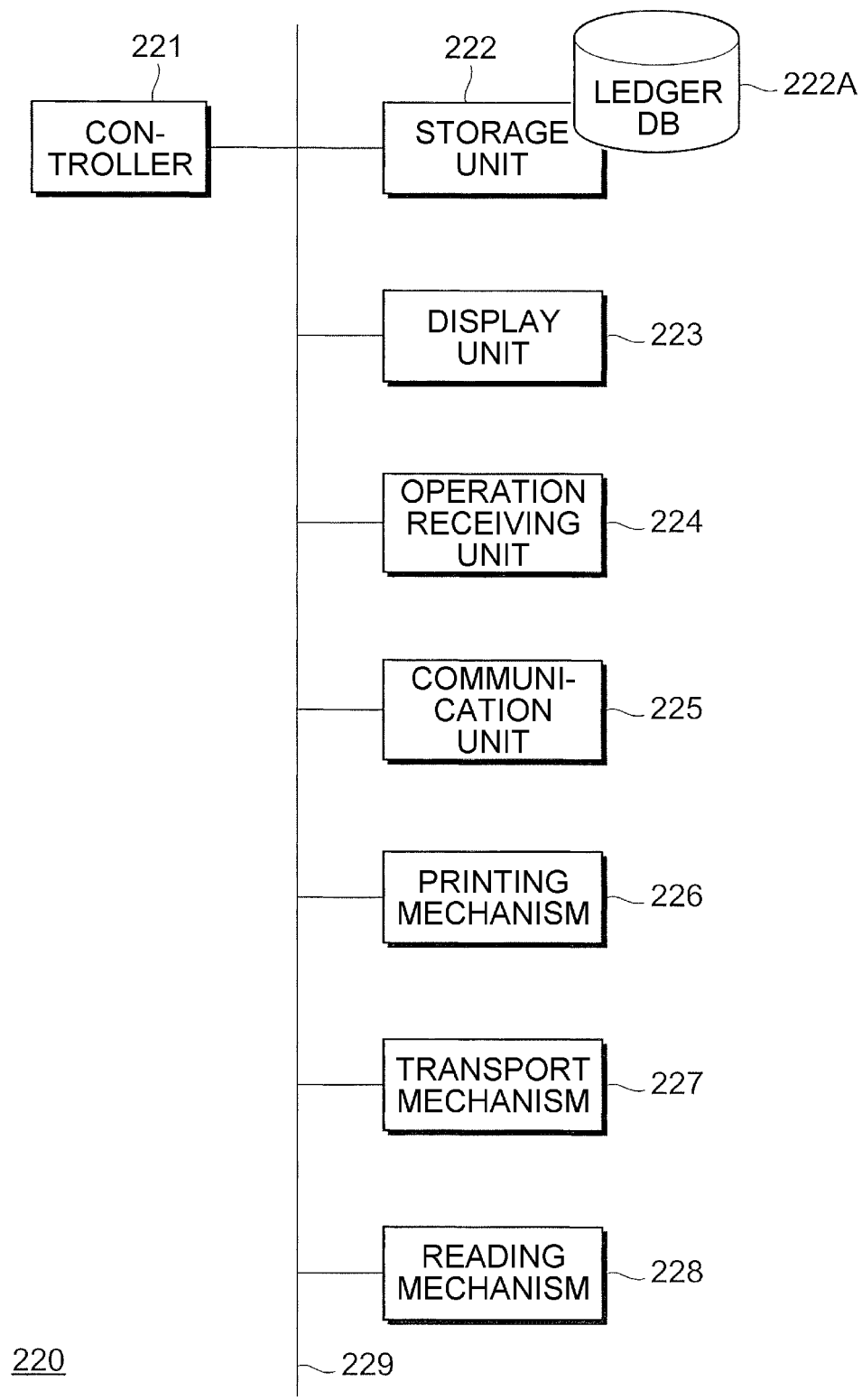
FIG. 4 is a view illustrating an example of a hardware configuration of an image forming apparatus.

FIG. 4 is a view illustrating an example of a hardware configuration of the image forming apparatus 220.

The image forming apparatus 220 includes: a controller 221 that controls the entire apparatus; a storage unit 222 used for storing the JPEG file 10 and the like; a display unit 223 that displays an operation screen and the like; an operation receiving unit 224 that receives a user's operation; a communication unit 225 used for communication with an external device; a printing mechanism 226 that prints an image by, for example, an electrophotographic method or an inkjet method; a transport mechanism 227 that transports a sheet of paper as a recording material; and a reading mechanism 228 that optically reads an image.

The controller 221 and each unit are connected to each other via a bus 229.

The controller 221 is configured with a central processing unit (CPU), a read only memory (ROM), and a random access memory (RAM). The ROM stores a basic input/output system (BIOS) and firmware executed by the CPU. The RAM is used as a work area of a program. The controller 221 controls the operation of each unit through execution of firmware or the like.

The storage unit 222 is configured with a storage device such as a hard disk device or a semiconductor memory. In addition to the JPEG file 10, the information related to the use history of the object (ledger database 222A) is recorded in the storage unit 222 according to the present exemplary embodiment.

The display unit 223 is a display device that displays various images. The display unit 223 is configured with, for example, a liquid crystal display panel or an organic EL display panel.

The operation receiving unit 224 is a device that receives an operation from a user, and includes, for example, a button, a switch, a touch panel, and the like.

The communication unit 225 includes, for example, a local area network (LAN) interface and an Internet of Things (IOT) interface, and communicates with other devices existing on the network in a peer-to-peer manner. The communication unit 215 is an example of a communication unit. For example, an Ethernet (registered trademark) interface, WiFi (registered trademark), Bluetooth (registered trademark), ZigBee (registered trademark), or the like is used for the communication described here.

The printing mechanism 226 has printing units corresponding to four colors of yellow (Y), magenta (M), cyan (C), and black (K). Each printing unit of the electrophotographic process includes a photoconductor drum, a charging unit that charges the surface of the photoconductor drum, an exposure unit that irradiates the charged photoconductor drum with a laser beam to draw an image, a developing unit that develops the drawn image as a toner image, a transfer unit that transfers the toner image to a sheet P, and a fixing device that fixes the transferred toner image onto the sheet P.

The transport mechanism 227 is configured with a mechanism for transporting sheets stored in a sheet tray (not illustrated) one by one to the printing mechanism 226.

The reading mechanism 228 includes, for example, an automatic document feeder and a scanner.

FIG. 2 is referred to again.

The content server 300 is configured as a so-called computer. The content server 300 has a content database (DB) 310 that stores the JPEG file 10 and a ledger database 320 that manages the information related to the use history of the object.

The management server 400 is configured as a so-called computer. The management server 400 has a ledger database 410 that manages the information related to the use history of the object.

The computer 210, the image forming apparatus 220, the management server 400, and the content server 300 in the present exemplary embodiment share the information related to the use history of the image corresponding to the object (ledger database). That is, common information is held in the ledger database 320, the ledger database 410, the ledger database 212A (see FIG. 3), and the ledger database 222A (see FIG. 4). This management method is called a distributed ledger method.

In the present exemplary embodiment, the following method is adopted. That is, every time information related to the use of the image (a block which will be described later) is newly generated, it is verified whether the history of the image is correctly handed over between the plural ledger databases, and when the validity is verified, the individual ledger databases are updated. That is, a technique called the blockchain is adopted for managing the information related to the use of images.

Further, when a branch occurs as a continuation relationship of information related to the use of an image (a block which will be described later), for example, one having a larger number of continuing blocks after branching is regarded as a correct history.

Figure 5:
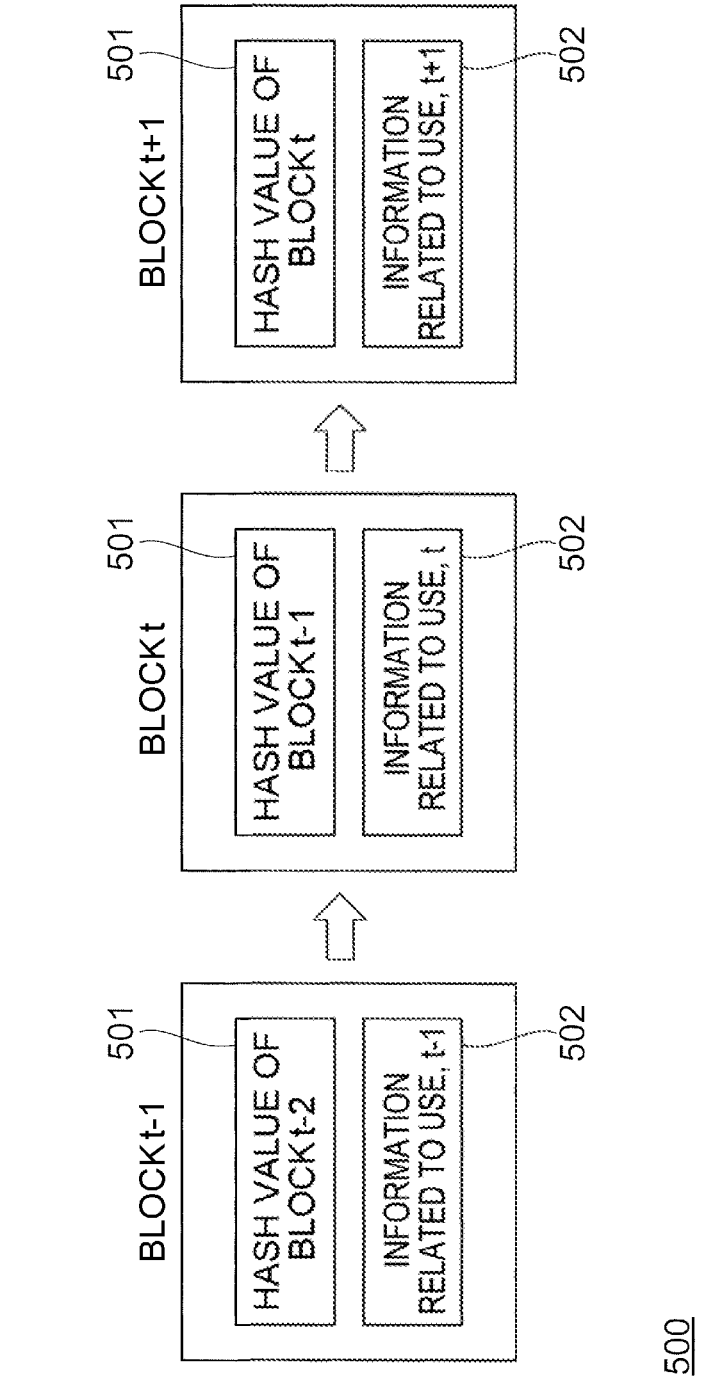
FIG. 5 is a view for explaining an example of a data structure used for recording information related to a use history of an image used in the first exemplary embodiment.

FIG. 5 is a view for explaining an example of a data structure 500 used for recording information related to a use history of an image used in the first exemplary embodiment.

In the present exemplary embodiment, information related to an individual use of an image corresponding to one object is managed as a block. A new block is required to be linked with a block corresponding to the immediately preceding use. This data structure 500 is called a blockchain.

In the example of FIG. 5, a linking relationship among a block t−1 corresponding to a (t−1)-th use, a block t corresponding to a t-th use, and a block t+1 corresponding to a (t+1)-th use is illustrated.

Each block includes a hash value 501 calculated for the information of the immediately preceding block and information 502 related to a use corresponding to each block. For example, the block t contains the hash value 501 of the block t−1. This linking relationship is a chain.

In the present exemplary embodiment, the information 502 related to the individual use is encrypted using a public key disclosed by the content server 300. Therefore, only the content server 300 can confirm the use history using its own secret key.

FIG. 6 is a view for explaining an example of use history data 600 managed by the content server 300.

In an example of FIG. 6, a use history related to the character 20 is illustrated. The use history data 600 includes a number 601 indicating how many times the character 20 has been used, a date and time 602, a used device 603, a user 604, a content of use 605, a charge 606, and the like.

For example, it is recorded that the second use of the character 20 is a duplication performed by Mr. N using a device of which the serial number is "XYZ000000" at "23:01:35 on May 7, 2017," and that a charge of US$0.50 is incurred. For example, the date and time 602, the used device 603, the user 604, and the content of use 605 are recorded in individual blocks.

Figure 7:
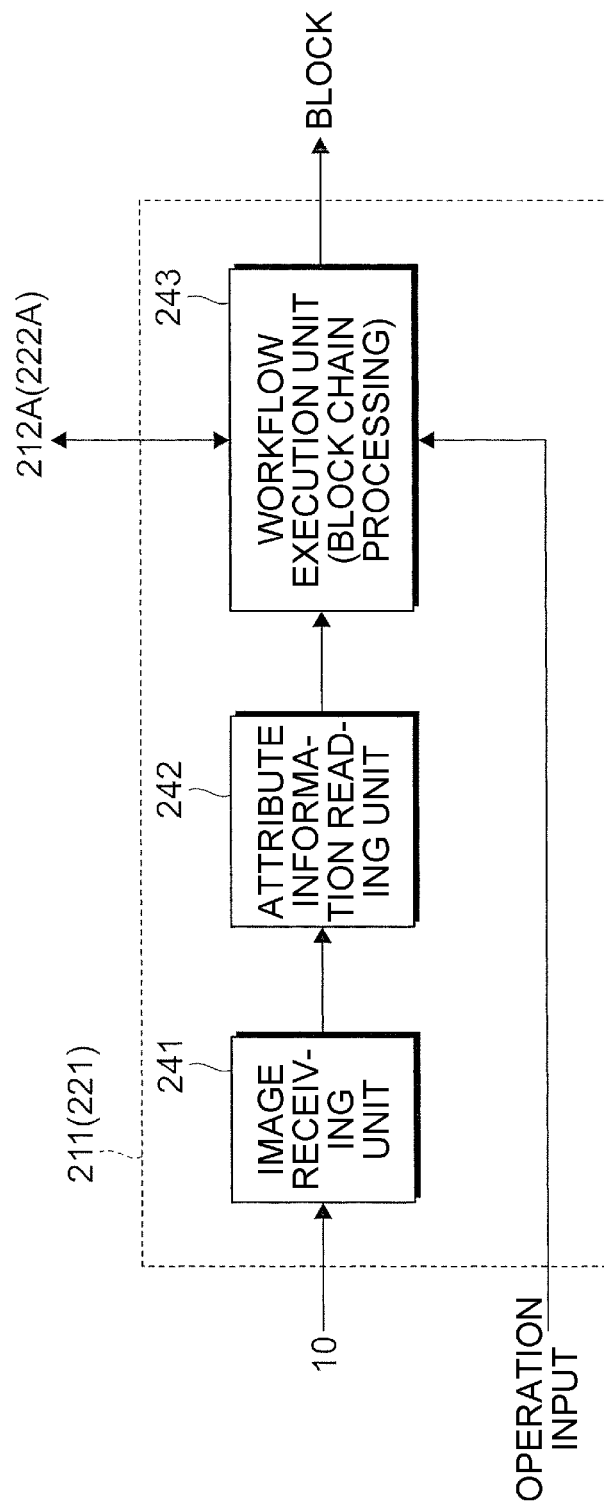
FIG. 7 is a view for explaining a function of generating information related to a use history among functional components of a controller constituting the computer and a controller constituting an image forming apparatus.

FIG. 7 is a view for explaining a function of generating information related to a use history among functional components of the controller 211 (see FIG. 3) constituting the computer 210 (see FIG. 2) and the controller 221 (see FIG. 4) constituting the image forming apparatus 220 (see FIG. 2).

The controller 211 (221) includes: an image receiving unit 241 that receives the JPEG file 10, an attribute information reading unit 242 that reads the attribute information 16 (see FIG. 1) from the received JPEG file 10, and a workflow execution unit 243 that executes the workflow process defined by the information 13A included in the attribute information 16.

Here, the image receiving unit 241 is an example of a receiver, and the workflow execution unit 243 is an example of a transmitter.

In the present exemplary embodiment, the workflow execution unit 243 generates a new block (see FIG. 5) including a usage mode specified by an operation input.

The newly generated block is transmitted to the content server 300 through a peer-to-peer communication. Further, on condition that the validity of the newly generated block is verified, the workflow execution unit 243 updates the ledger database 212A (222A) of its own apparatus.

<Processing Operation>

Hereinafter, the processing operations executed by an information processing apparatus (for example, the computer 210 (see FIG. 2)) constituting the image processing system 100 (see FIG. 2) will be described.

Figure 8:
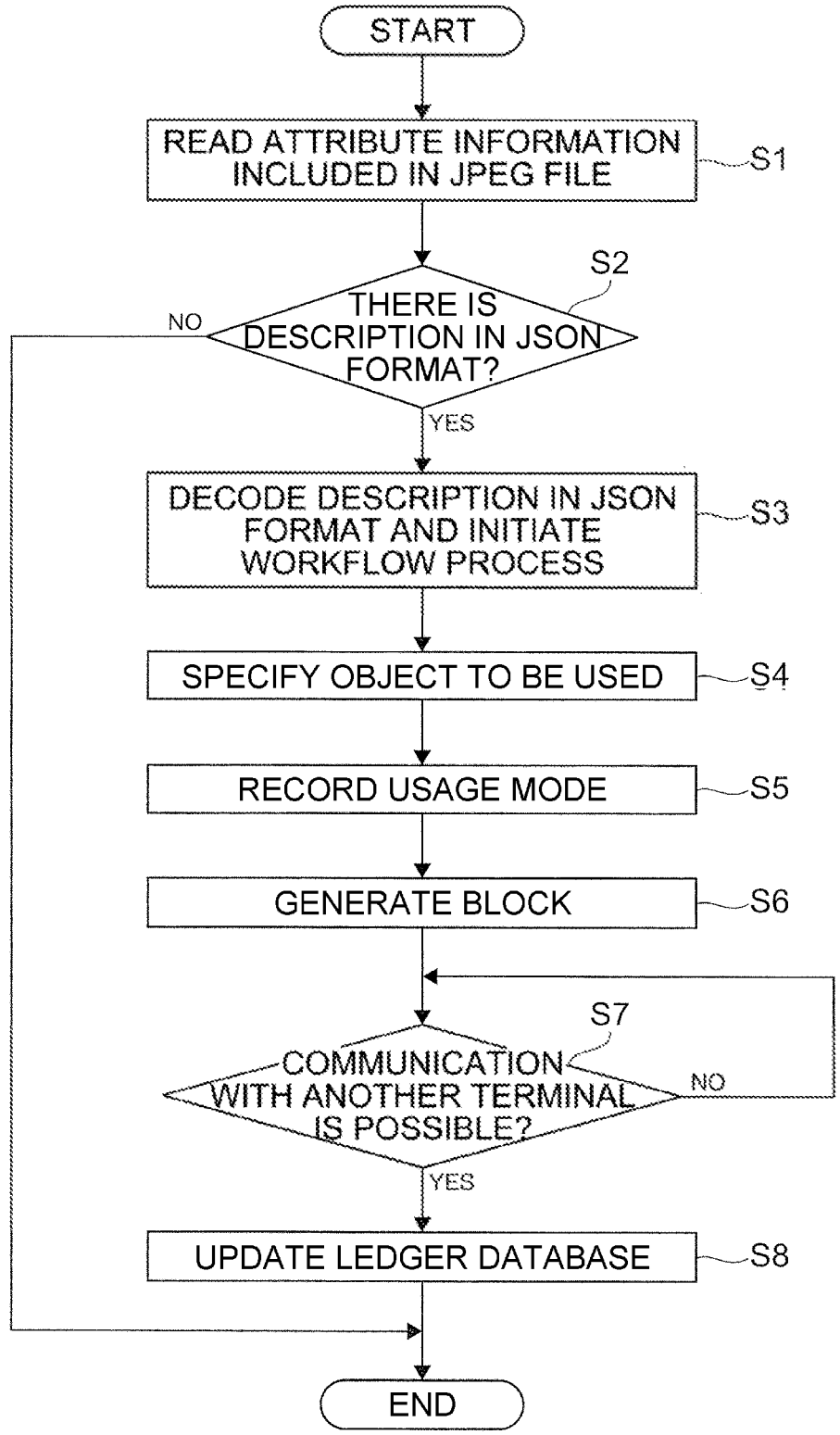
FIG. 8 is a flowchart illustrating an example of processing operations executed by the controller according to the first exemplary embodiment.

FIG. 8 is a flowchart illustrating an example of processing operations executed by the controller 211 (see FIG. 3) according to the first exemplary embodiment.

First, the controller 211 reads the attribute information 16 (see FIG. 1) from the JPEG file 10 (see FIG. 1) designated as a use target (Step 1).

Next, the controller 211 determines whether there is a description in the JSON format (that is, the information 13A) in the attribute information 16 (Step 2). When it is determined that there is no description in the JSON format (in the case of a negative result), the controller 211 terminates the process without executing subsequent processes. On the other hand, when it is determined that there is a description in the JSON format (in the case of an affirmative result), the controller 211 decodes the description in the JSON format (that is, the information 13A) and initiates the workflow process (Step 3).

Subsequently, the controller 211 specifies an object to be used (Step 4) and records the usage mode (Step 5). Step 4 is provided in preparation for a case where only a portion of objects is used when plural objects are included in the image corresponding to the image data 14 (see FIG. 1). Examples of the usage mode include printing an image corresponding to an object on a sheet of paper, duplicating to another recording medium different from the currently recorded recording medium, modification, recording, transmitting to another terminal, transmitting (distributing, broadcasting) to an unspecified terminal, and the like.

In addition, when an image corresponding to the character 20 is cut out from the image corresponding to the JPEG file 10 by an image editing software to create a new image file or when the image corresponding to the character 20 is modified to create a new image file, the information 13A that defines the workflow process is handed over to attribute information of the newly created image file.

Thereafter, the controller 211 generates a block (see FIG. 5) including newly generated information of the usage mode (Step 6). Here, the controller 211 generates the block including the hash value of the content of the immediately preceding block recorded in the ledger database 212A (see FIG. 3) that manages the use history accumulated in its own apparatus, and the data obtained by encrypting newly generated content of use with the public key of the content server 300 (see FIG. 2).

Subsequently, the controller 211 determines whether a communication with another terminal is possible (Step 7). While a communication with another terminal is not possible, the controller 211 waits without transmission of the generated block. On the other hand, when it is determined that a communication with another terminal is possible or a communication is restored, the controller 211 transmits the generated block to the content server 300 as a destination in a peer-to-peer manner. Further, the content server 300 notifies other devices, which hold the ledger databases, of the received block in a peer-to-peer manner.

Thereafter, the controller 211 waits for another terminal (the image forming apparatus 220, the content server 300, or the management server 400 in the present exemplary embodiment) to verify the validity of the new block and updates the ledger database 212A (see FIG. 3) (Step 8).

Further, when receiving the new block from the computer 210 (see FIG. 2), each of the image forming apparatus 220 (see FIG. 2) that manages the ledger database 222A (see FIG. 4), the content server 300 (see FIG. 2) that manages the ledger database 320 (see FIG. 2), and the management server 400 (see FIG. 2) that manages the ledger database 410 (see FIG. 2) verifies whether the past history is handed over (that is, the validity) such as whether the hash value of the immediately preceding block included in the block is correct. When an agreement is formed with another terminal with respect to the result of the verification, each of individual ledger databases is updated.

Effect of First Exemplary Embodiment

As describe above, in the present exemplary embodiment, when the image corresponding to the object included in the JPEG file 10 is used, the information related to the use is transmitted as a block to the content server 300 according to the description of the information 13A recorded in the attribute information 16 of the JPEG file 10. Therefore, regardless of a terminal that operates the JPEG file 10, the use history of the object (in this case, character 20) may be managed by the content server 300 without omission.

In addition, by adopting the blockchain technology to manage the use history of the object, it is possible to prevent falsification of information.

Further, since an encryption key (the public key of the content server 300) is used to record the newly generated usage mode, the individual use histories of the image corresponding to the character 20 may be limited only to the content server 300 having the corresponding secret key. That is, even when the ledger database is distributed among plural terminals, the confidentiality of the contents thereof may be maintained.

As described above, in the present exemplary embodiment, the use history of the image may be easily managed unlike a case where the attribute information 16 is used for recording the conditions of capturing.

Second Exemplary Embodiment

In the above-described exemplary embodiment, the description has been made of the case where only one image corresponding to the object is included in the image data 14 (see FIG. 1) corresponding to the JPEG file 10 (see FIG. 1) (that is, only the robot type character 20 is included).

Here, a description will be made of a case where plural images corresponding to objects are included in image data 14.

Figure 9:
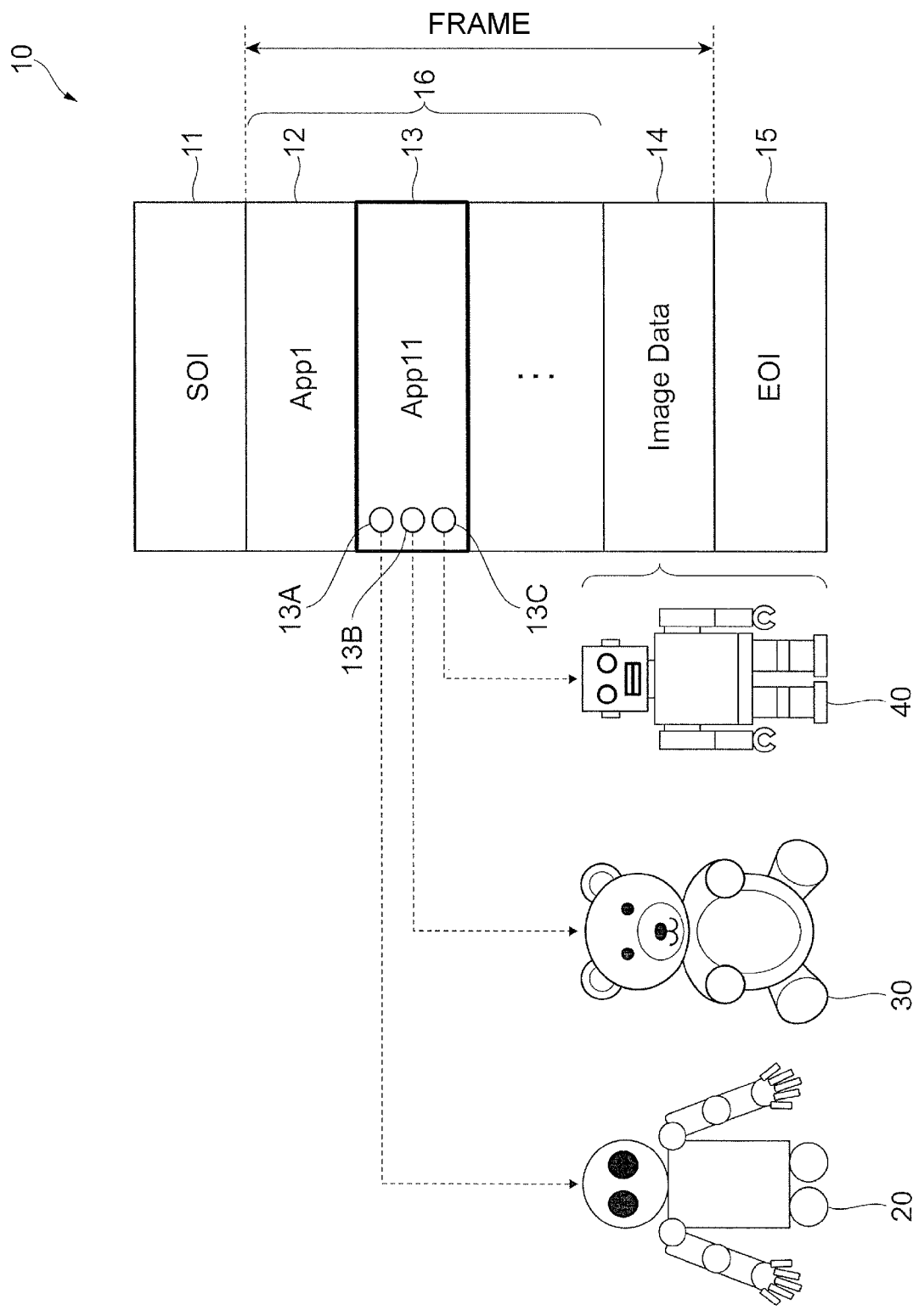
FIG. 9 is a view illustrating a data structure of a JPEG file used in a second exemplary embodiment.

FIG. 9 is a view illustrating a data structure of a JPEG file 10 used in a second exemplary embodiment.

In FIG. 9, portions corresponding to those in FIG. 1 are denoted by corresponding reference numerals.

In the case of FIG. 9, pixel values constituting a still image including robot type characters 20 and 40 and a bear character 30 are recorded in the data region of image data 14. Each of the characters 20, 30, and 40 here is an example of the image corresponding to the object. The image data 14 is an example of image data corresponding to the characters 20, 30, and 40.

In the case of the JPEG file 10 illustrated in FIG. 9, information 13A corresponding to the character 20, information 13B corresponding to the character 30, and information 13C corresponding to the character 40 are recorded in the application type 11 segment 13.

The information 13A here is linked to a partial region in which the character 20 is displayed, the information 13B is linked to a partial region in which the character 30 is displayed, and the information 13C is linked to a partial region in which the character 40 is displayed.

In the present exemplary embodiment, the use history is managed for each character.

Figure 10:
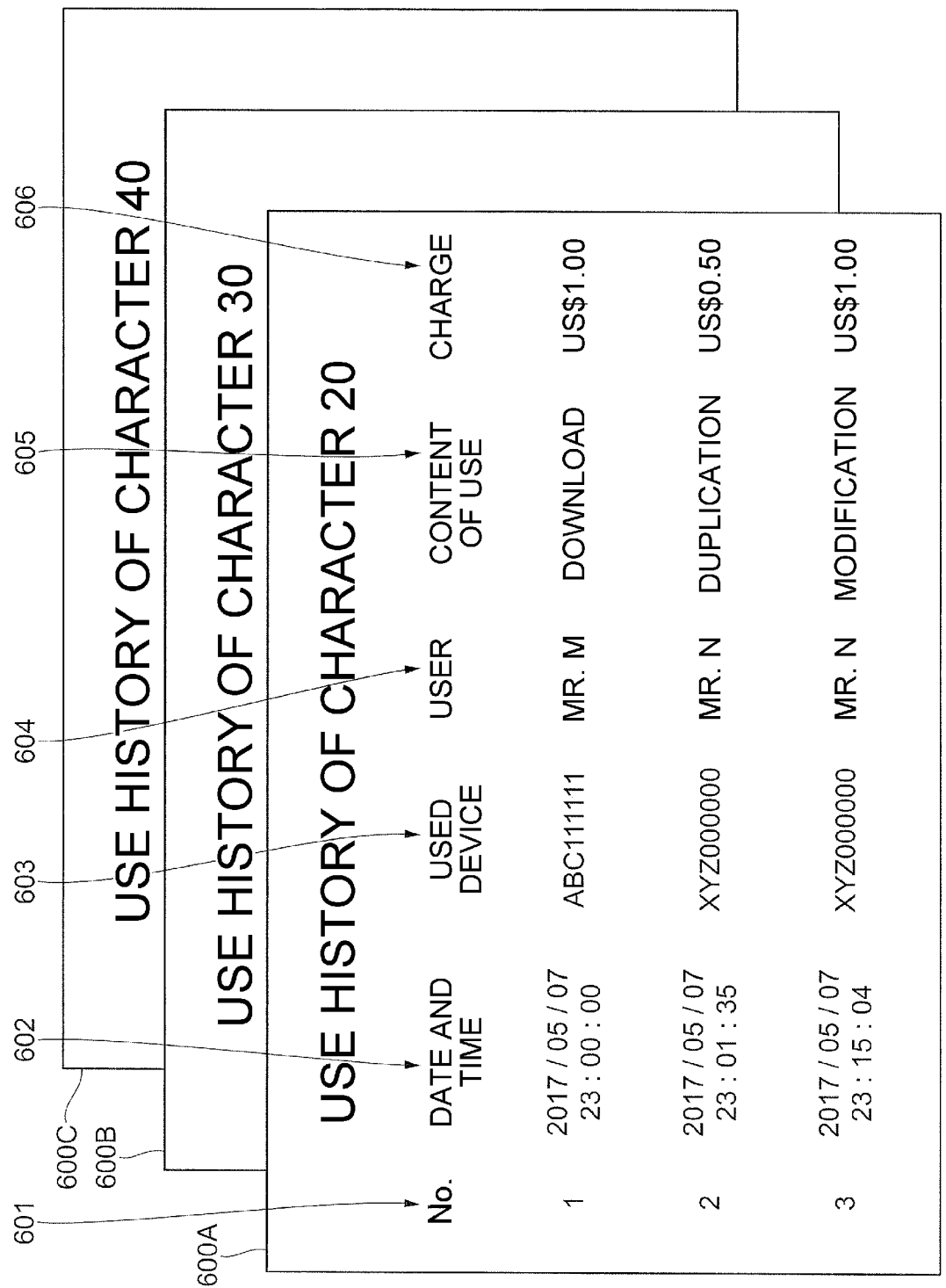
FIG. 10 is a view for explaining an example of use history data prepared for each character in the content server.

FIG. 10 is a view for explaining an example of use history data 600A to use history data 600C which are prepared for the respective characters in a content server 300.

In FIG. 10, portions corresponding to those in FIG. 6 are denoted by corresponding reference numerals.

Here, the use history data 600A corresponds to the robot type character 20, the use history data 600B corresponds to the bear character 30, and the use history data 600C corresponds to the robot type character 40.

For example, when the entirety of the image data 14 is printed, all of the use history data 600A to the use history data 600C are updated.

For example, when only the image of the partial region corresponding to the robot type character 20 in the image data 14 is duplicated, only the use history data 600A is updated and the use history data 600B and the use history data 600C are not updated.

In this way, since the information 13A to 13C that each defines a workflow process for the corresponding character included in the image data 14 is prepared in the present exemplary embodiment, the use history of each character may be managed.

Third Exemplary Embodiment

In the above-described exemplary embodiment, the description has been made of the case of managing the use history for each of the characters included in the image data 14 (see FIG. 1) corresponding to the JPEG file 10 (see FIG. 1).

Here, a description will be made of a case where a single use history is managed as a whole even when image data 14 includes images corresponding to plural characters.

Figure 11:
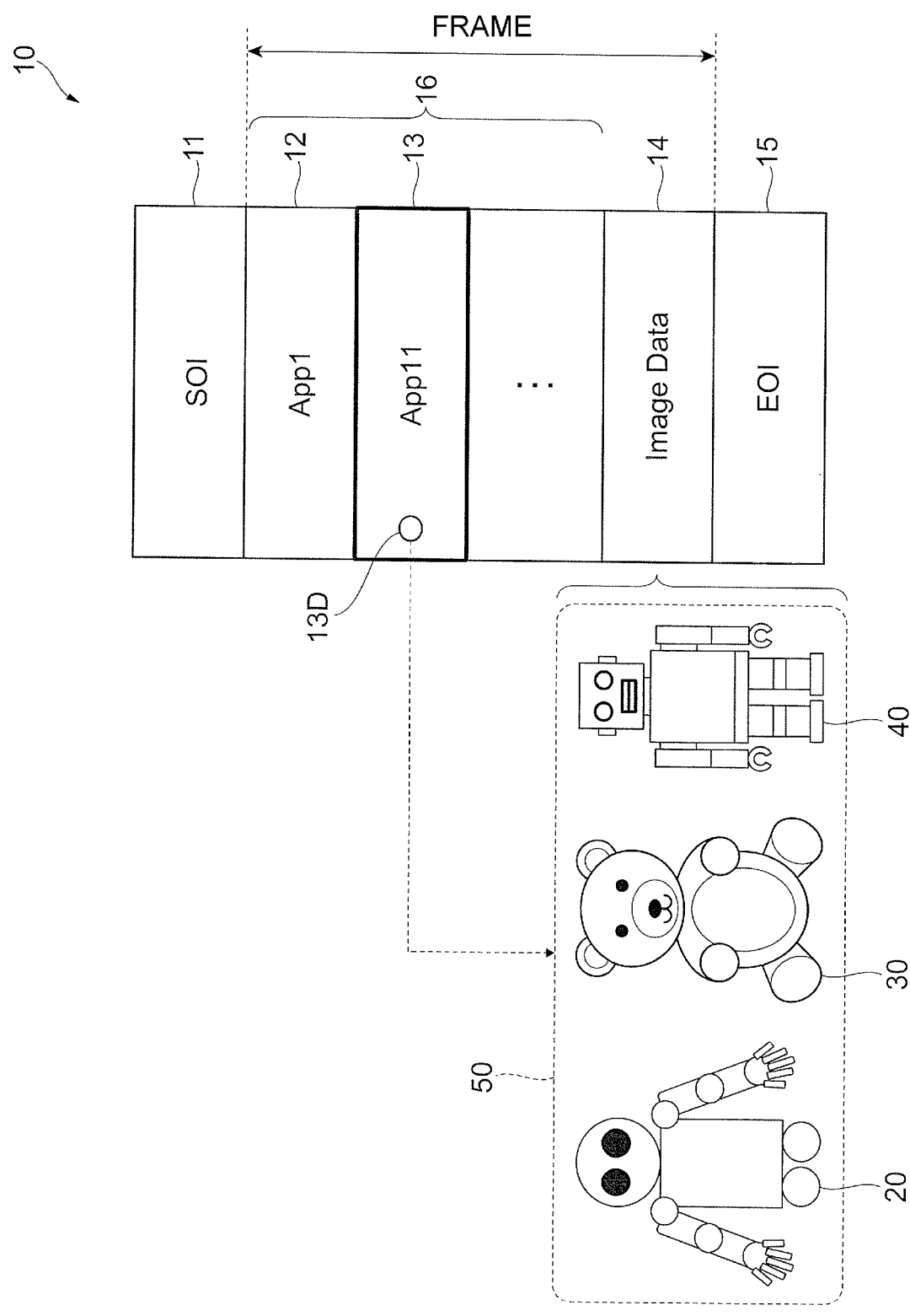
FIG. 11 is a view illustrating a data structure of a JPEG file used in a third exemplary embodiment.

FIG. 11 is a view illustrating a data structure of a JPEG file 10 used in a third exemplary embodiment.

In FIG. 11, portions corresponding to those in FIG. 9 are denoted by corresponding reference numerals.

In the case of FIG. 11, pixel values constituting a still image including robot type characters 20 and 40 and a bear character 30 are recorded in a data region of image data 14. It should be noted that in the present exemplary embodiment, the entire image including the characters 20, 30, and 40 is managed as one object. In other words, in the present exemplary embodiment, the use history is managed for one group 50 including plural characters.

Therefore, information 13D is recorded for the entire image region of the image data 14 in an application type 11 segment 13.

FIG. 12 is a view for explaining an example of use history data 600D prepared for each group in a content server 300.

In FIG. 12, portions corresponding to those in FIG. 6 are denoted by corresponding reference numerals.

In this example, for example, in both the case where the entirety of the image data 14 is printed and the case where only the image of a partial region corresponding to the robot type character 20 in the image data 14 is duplicated, the use history data 600D is updated.

As described above, in the present exemplary embodiment, the use history may be managed for each group by preparing the information 13D that defines the workflow process for the group 50 including plural characters included in the image data 14.

Fourth Exemplary Embodiment

In the third exemplary embodiment, the description has been made of the case in which when images corresponding to plural characters included in the image data 14 (see FIG. 1) corresponding to the JPEG file 10 (see FIG. 1) are included, the plural images are managed as one group.

Here, a description will be made of a mixed type of management of a use history on a character basis and management of a use history on a group basis.

Figure 13:
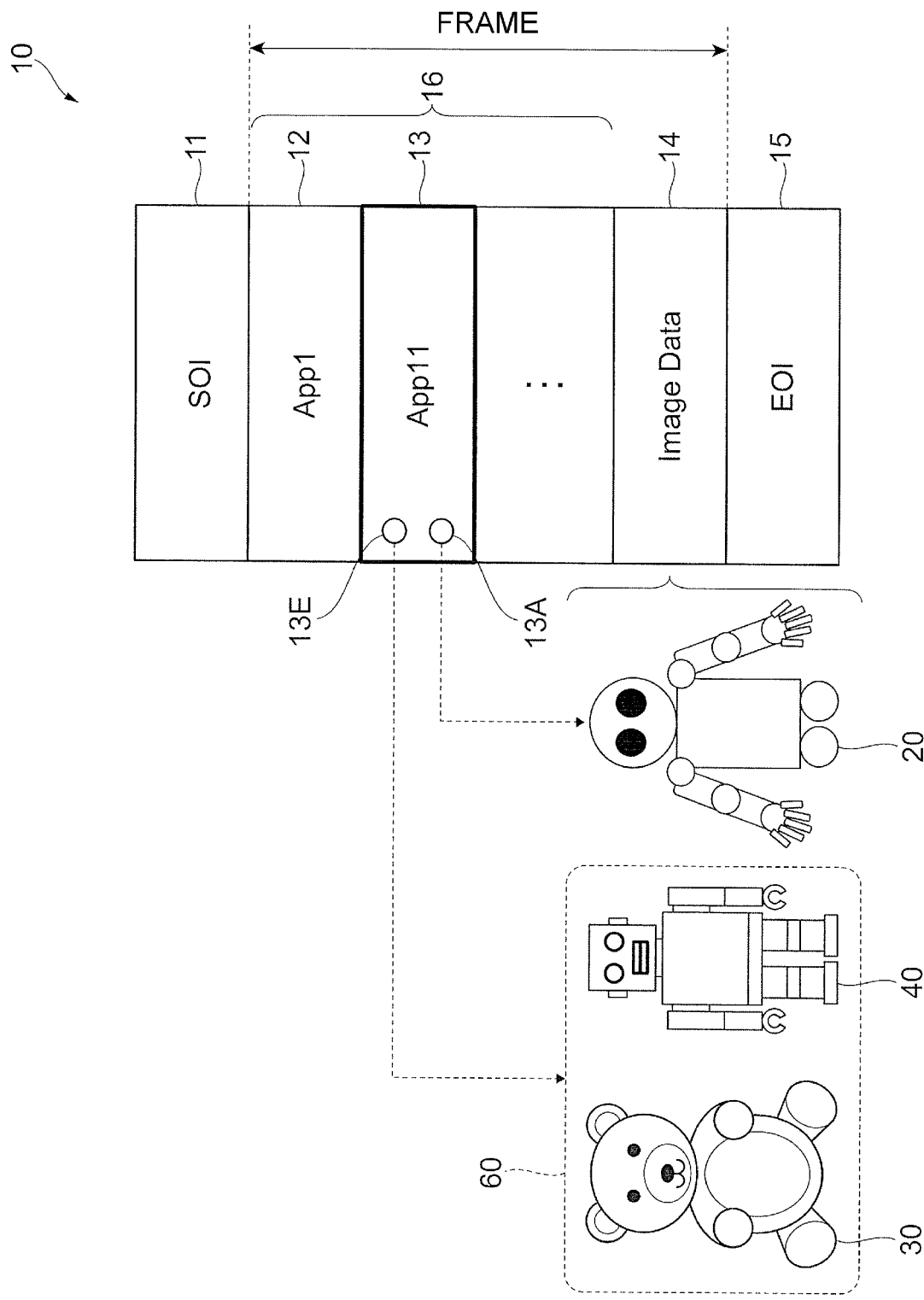
FIG. 13 is a view illustrating a data structure of a JPEG file used in the third exemplary embodiment.

FIG. 13 is a view illustrating a data structure of a JPEG file 10 used in the third exemplary embodiment.

In FIG. 13, portions corresponding to those in FIG. 9 are denoted by corresponding reference numerals.

In the case of FIG. 13, pixel values constituting a still image including robot type characters 20 and 40 and a bear character 30 are recorded in a data region of image data 14.

It should be noted that in the present exemplary embodiment, the character 20 is managed as one object, and the characters 30 and 40 are managed as one object. In other words, the characters 30 and 40 are managed as a group 60.

Therefore, in an application type 11 segment 13, information 13A is recorded in association with the character 20 in the image data 14, and information 13E is recorded in the entire image region of the characters 30 and 40.

Figure 14:
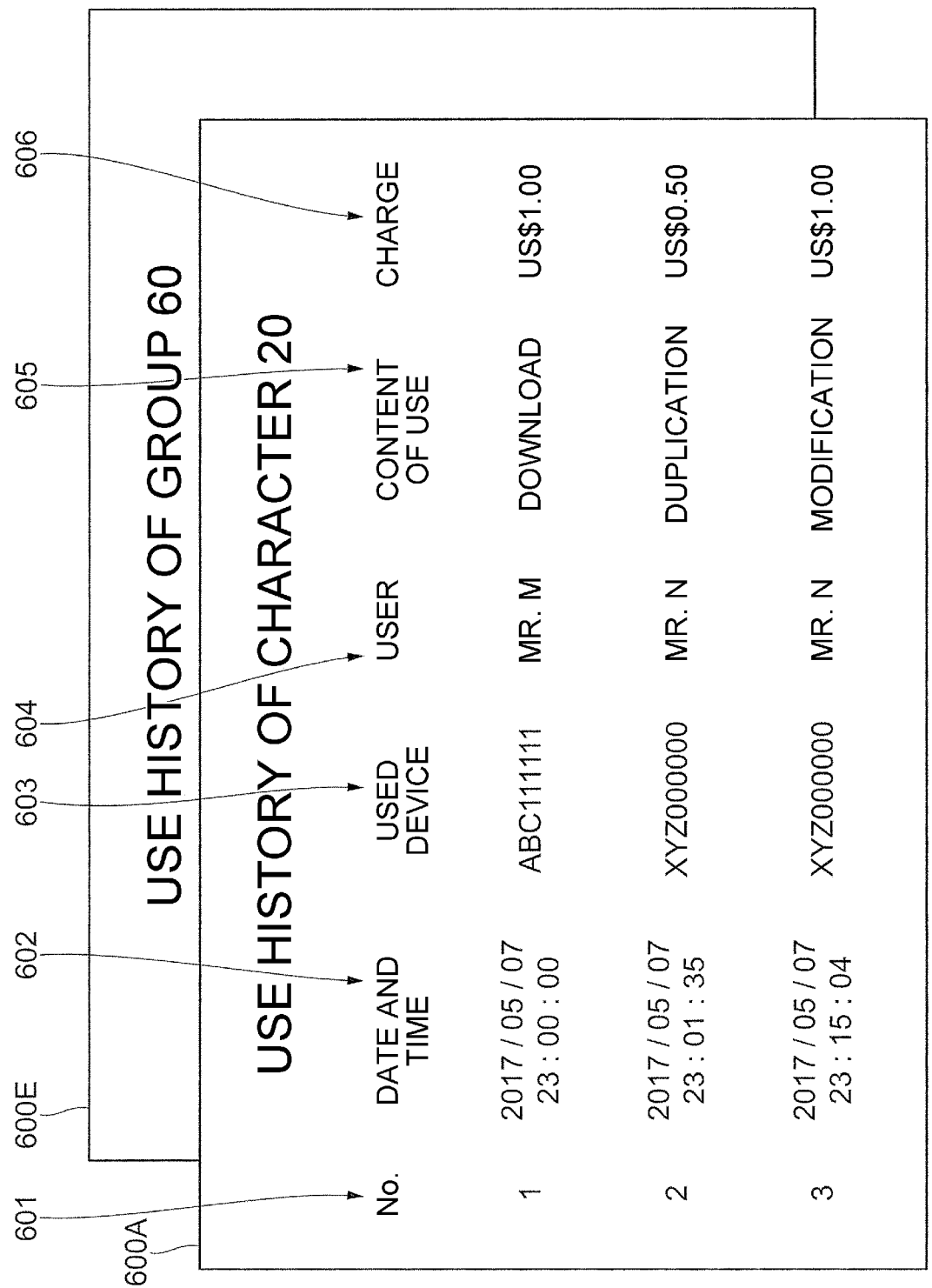
FIG. 14 is a view for explaining an example of use history data prepared for each character and use history data prepared for each group in the content server.

FIG. 14 is a view for explaining an example of use history data 600A prepared for each character and use history data 600E prepared for each group in the content server 300.

In this case, for example, when the entirety of the image data 14 is printed, the use history data 600A corresponding to the robot type character 20 and the use history data 600E of the group 60 corresponding to the bear character 30 and the robot type character 40 are updated.

Meanwhile, when only an image of a partial region corresponding to the robot type character 20 is duplicated, only the use history data 600A is updated and the use history data 600E is not updated.

Conversely, when only an image of a partial region corresponding to either or both of the bear character 30 and the robot type character 40 is modified, only the use history data 600E is updated and the use history data 600A is not updated.

As described above, in the present exemplary embodiment, the use history of the plural characters included in the image data 14 may be managed on the group basis and on the character basis.

Fifth Exemplary Embodiment

In the above-described exemplary embodiment, the description has been made of the case of managing the use history of plural objects by one server (content server 300). A description will be made of a case of managing the use history of plural objects by different servers.

Figure 15:
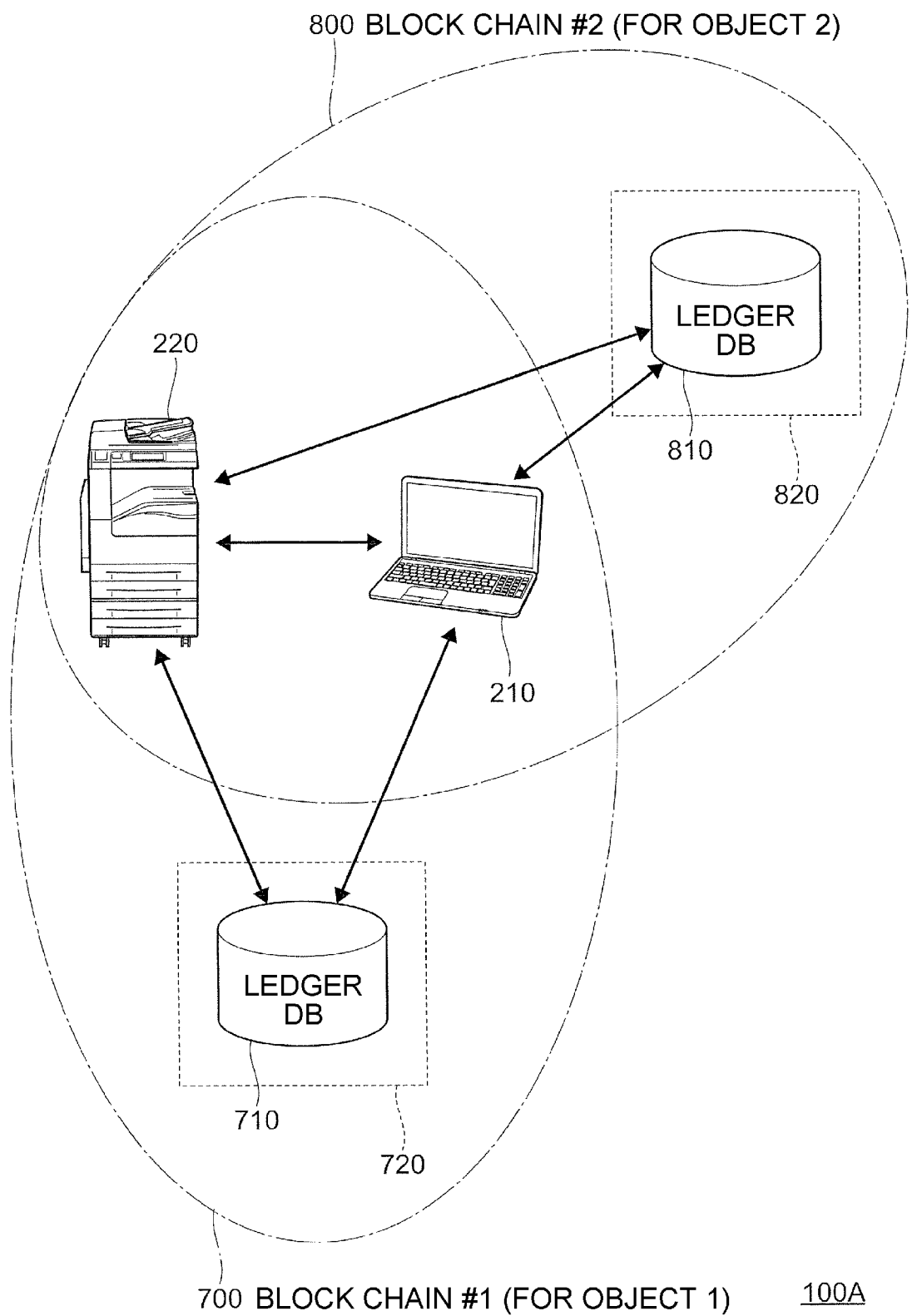
FIG. 15 is a view illustrating a configuration example of a blockchain used in an image processing system according to a fifth exemplary embodiment.

FIG. 15 is a view illustrating a configuration example of blockchains 700 and 800 used in an image processing system 100A according to a fifth exemplary embodiment.

In FIG. 15, portions corresponding to those in FIG. 2 are denoted by corresponding reference numerals.

The image processing system 100A includes: a server 710 that manages a use history of an object 1 in a computer 210 and an image forming apparatus 220; and a server 810 that manages a use history of an object 2 in the computer 210 and the image forming apparatus 220.

The server 710 has a storage device that stores a ledger database 720 used for managing the use history of the object 1. The server 810 has a storage device that stores a ledger database 820 used for managing the use history of the object 2.

In the present exemplary embodiment, the computer 210, the image forming apparatus 220, and the server 710 constitute a blockchain #1 (700) for the object 1, and the computer 210, the image forming apparatus 220, and the server 810 constitute a blockchain #2 (800) for the object 2.

With this configuration, the use history of each object may be managed by each of independent entities.

Sixth Exemplary Embodiment

In the above-described exemplary embodiment, the description has been made of the case where the ledger database exists in both the computer 210 and the image forming apparatus 220 constituting the local area network 200. That is, the description has been made of the case where the computer 210 and the image forming apparatus 220 in the local area network 200 also constitute one element of the blockchain.

Figure 16:
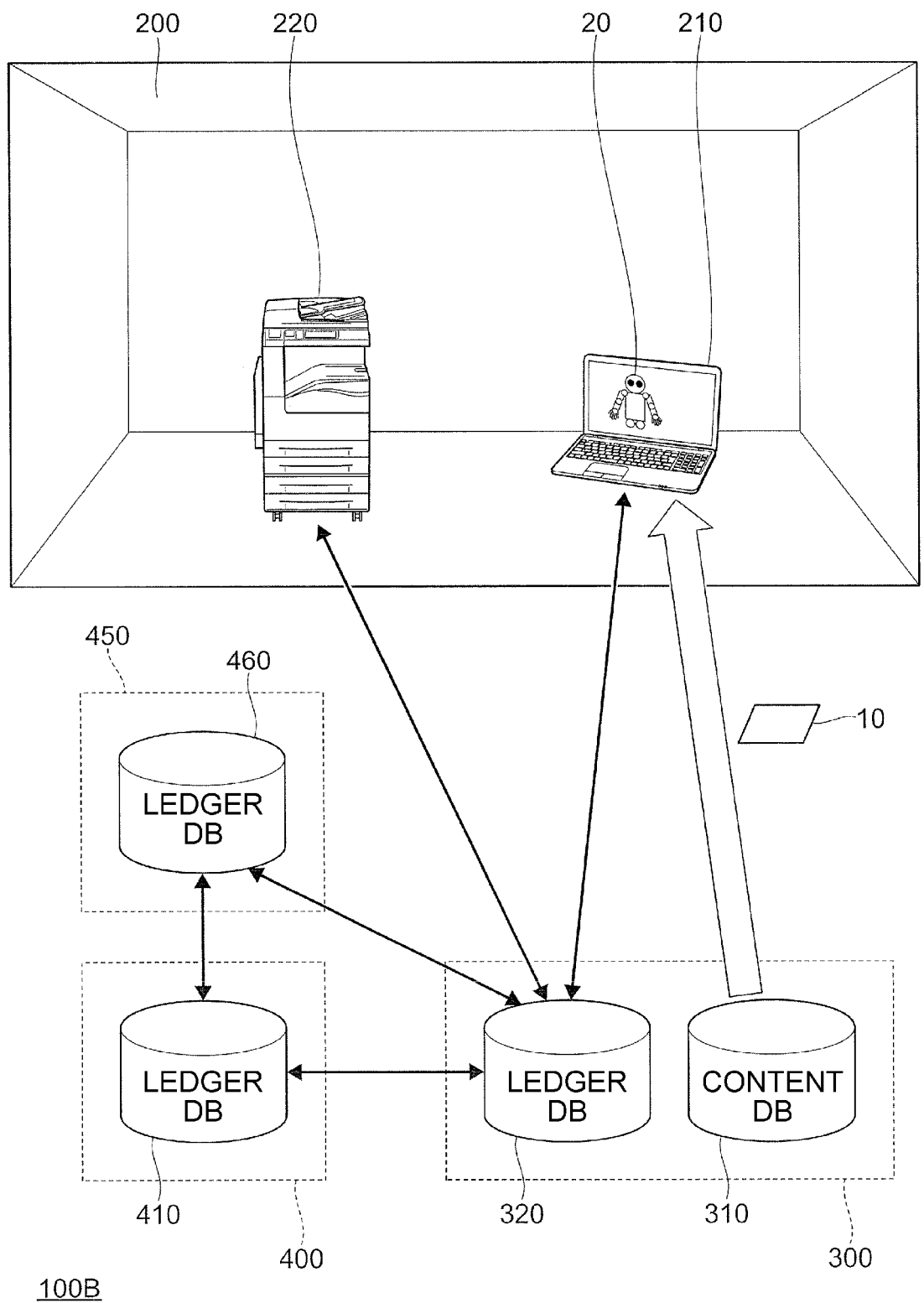
FIG. 16 is a view illustrating a configuration example of a blockchain used in an image processing system according to a sixth exemplary embodiment.

FIG. 16 is a view illustrating a configuration example of a blockchain used in an image processing system 100B according to a sixth exemplary embodiment.

In FIG. 16, portions corresponding to those in FIG. 2 are denoted by corresponding reference numerals.

In the present exemplary embodiment, a content server 300 that receives a notification indicating a use of an object from a computer 210 generates a block in which the content of each use is encrypted and stored, and verifies whether the newly generated block hands over the history information included in the preceding block with other servers 400 and 450 constituting the blockchain (ledger databases 410 and 460).

In this exemplary embodiment, every time the computer 210 or the image forming apparatus 220 uses the image corresponding to the object, the computer 210 or the image forming apparatus 220 notifies the content of use to the content server 300 as a destination. This notification is executed according to the workflow process defined in information 13A.

In this exemplary embodiment, it is possible to separate a local area network 200 in which the object is used and the content server 300 side in which the blockchain is constructed.

In this case, there is no need to store the ledger database in the computer 210 and the image forming apparatus 220.

Seventh Exemplary Embodiment

The above-described exemplary embodiment is premised on the blockchain. It should be noted that the configuration of the blockchain and technical elements implemented by the configuration of the blockchain may be omitted or a technical configuration portion implemented by the blockchain may be replaced with another technology.

Figure 17:
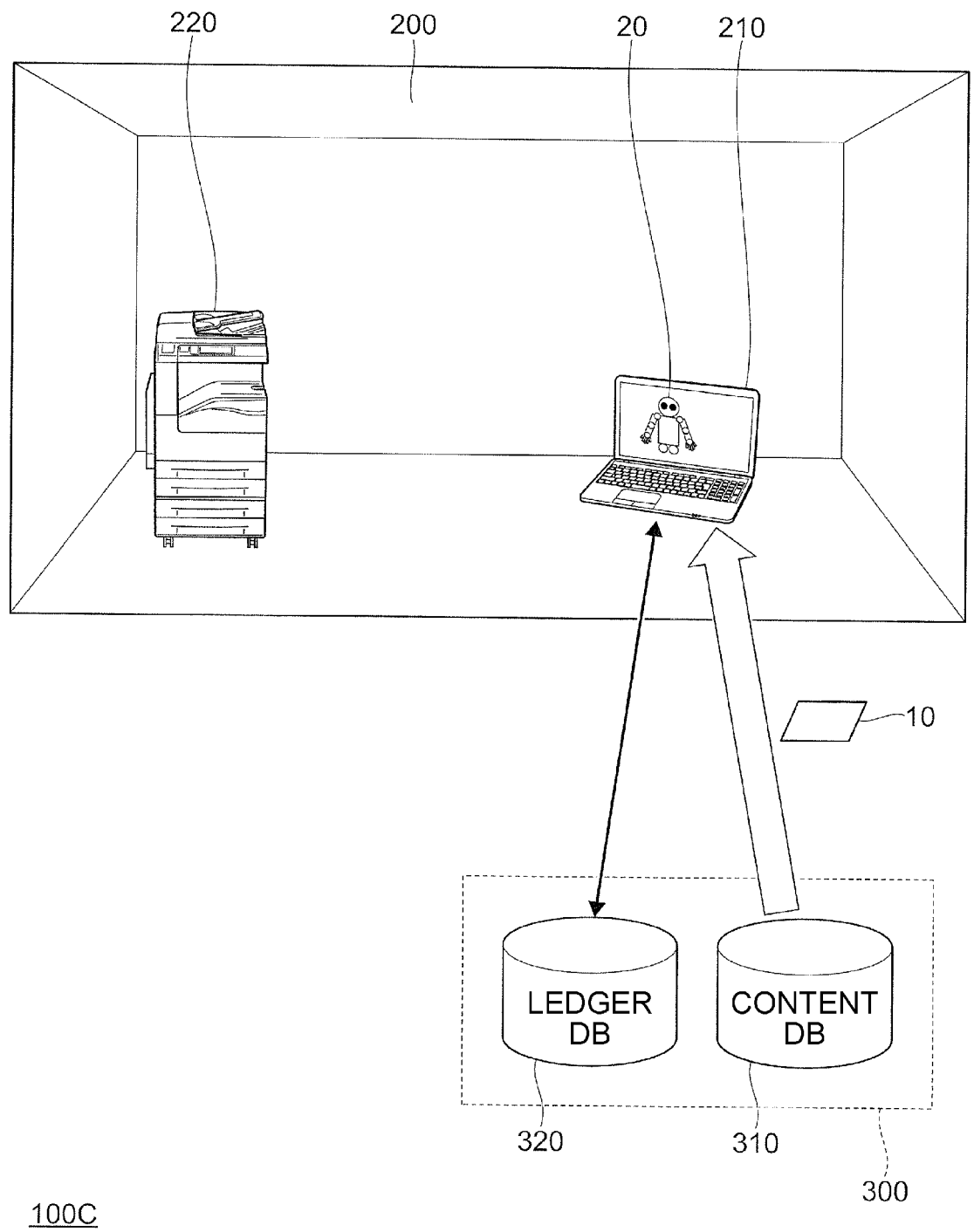
FIG. 17 is a view illustrating a configuration example of an image processing system according to a seventh exemplary embodiment.

FIG. 17 is a view illustrating a configuration example of an image processing system 100C according to a seventh exemplary embodiment.

In FIG. 17, portions corresponding to those in FIG. 16 are denoted by corresponding reference numerals.

In the present exemplary embodiment, a use of an object in a local area network 200 is notified from a computer 210 to a content server 300, and managed by a ledger database 320.

In this case, every time the use is confirmed, the content of use and the like are notified to the content server 300 based on a workflow process defined in information 13A.

Eighth Exemplary Embodiment

In the above-described exemplary embodiment, the description has been made of the case where the information 13A (see FIG. 1) that defines the workflow process executed along with the use of the object is recorded in the attribute information 16 (see FIG. 1) of the JPEG file 10 (see FIG. 1).

Here, a description will be made of a processing function for recording the information 13A in the attribute information 16.

Figure 18:
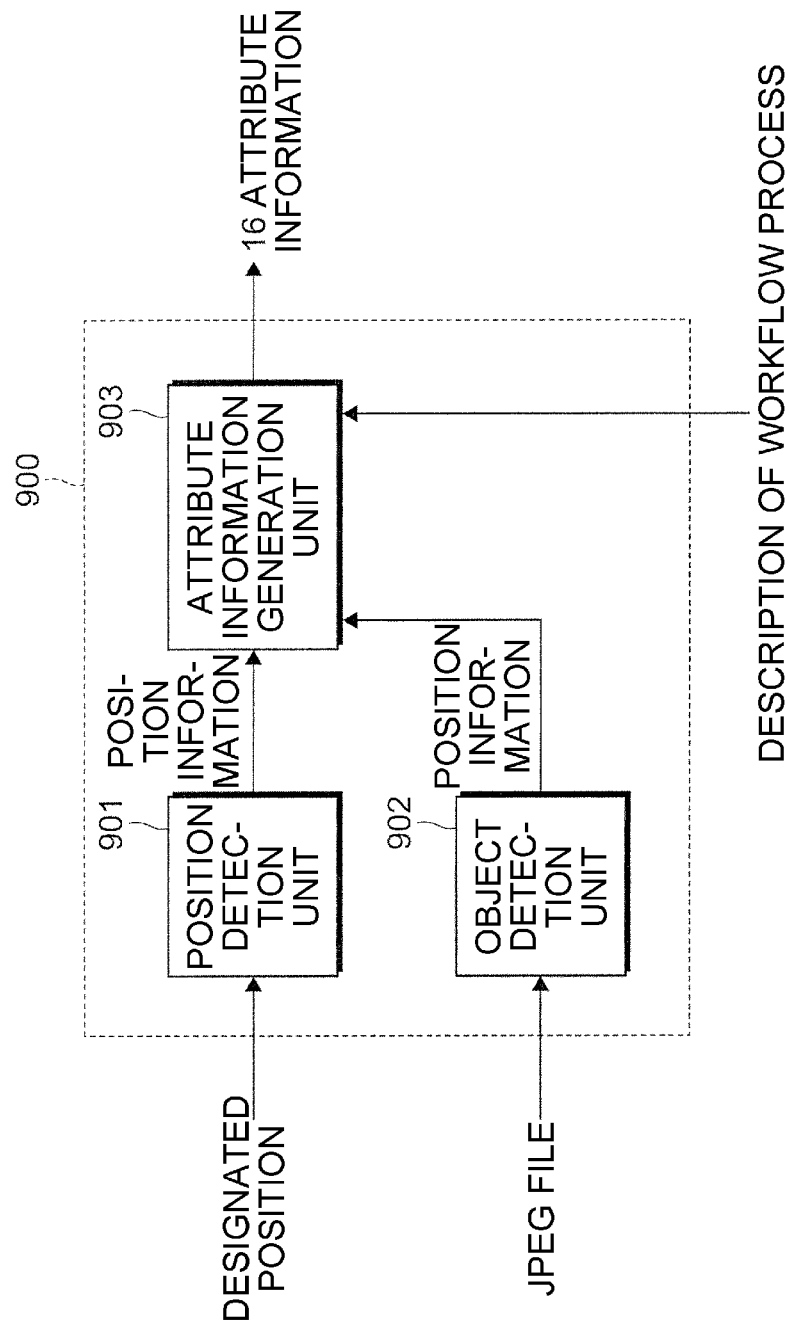
FIG. 18 is a block diagram illustrating an example of a functional configuration of a controller constituting an information processing apparatus (for example, computer) used for recording information that defines a workflow process.

FIG. 18 is a block diagram illustrating an example of a functional configuration of a controller 900 constituting an information processing apparatus (for example, computer) used for recording information 13A (see FIG. 1) that defines a workflow process.

Here, the controller 900 functions as: a position detection unit 901 that detects an object region designated by a user; an object detection unit 902 that detects a region of an image to be registered as an object using an image processing technology from image data 14 (see FIG. 1) of a JPEG file 10; and an attribute information generation unit 903 that generates the attribute information 16 in association with descriptions of workflow processes associated with the detected regions.

Figure 19:
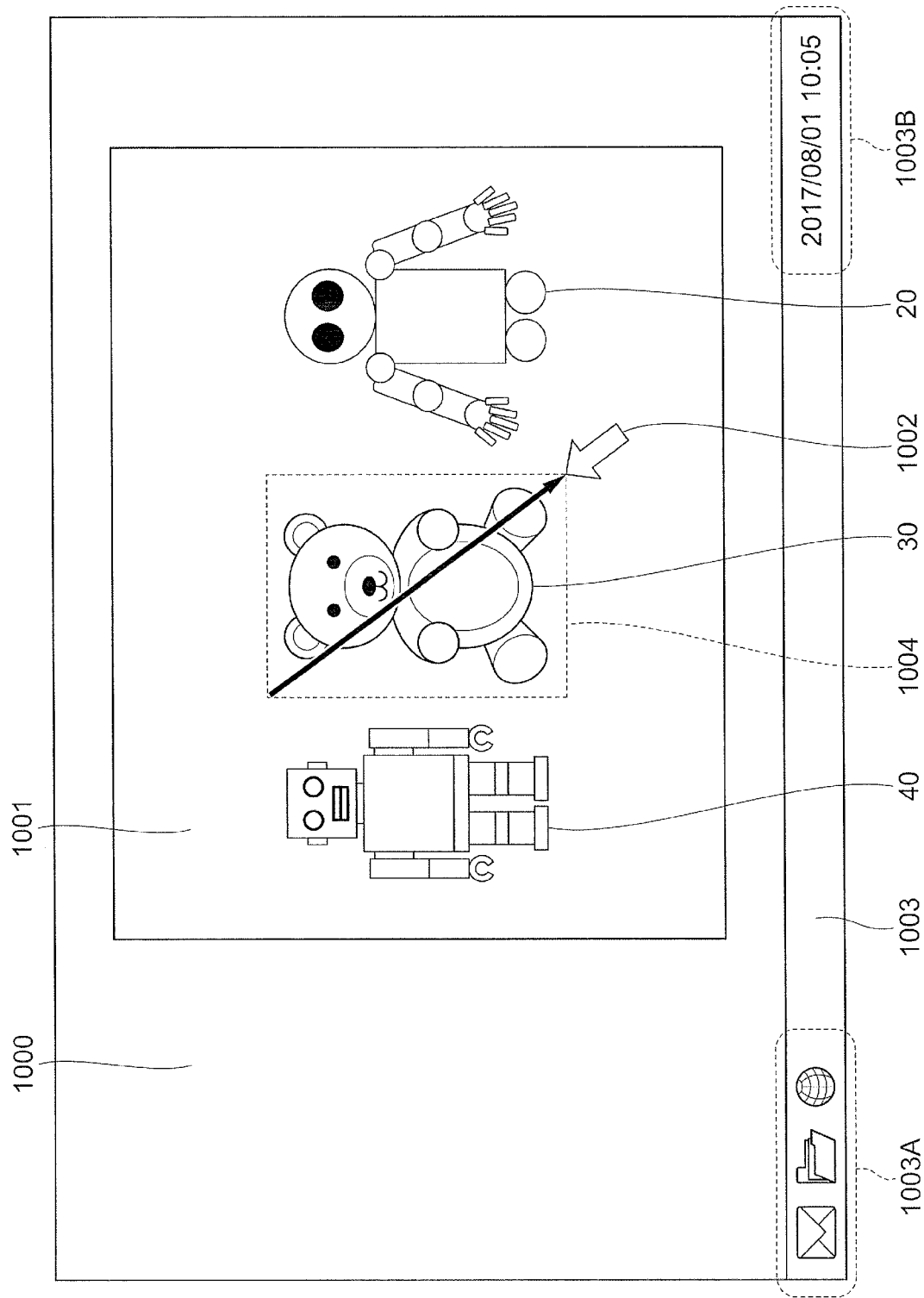
FIG. 19 is a view for explaining a state in which a region to be registered as an object is designated using a mouse pointer on a still image displayed on an operation screen.

FIG. 19 is a view for explaining a state in which a region to be registered as an object is designated using a mouse pointer 1002 on a still image 1001 displayed on an operation screen 1000.

In the case of FIG. 19, the still image 1001 is displayed on the operation screen 1000 as a small screen (window). The still image 1001 includes a robot type character 20 (see FIG. 9), a bear character 30 (see FIG. 9), and a robot type character 40 (see FIG. 9).

Further, at the bottom of the operation screen 1000, a task bar 1003 is provided and three active application icons 1003A and the current time 1003B are displayed.

Here, by dragging the mouse pointer 1002, a region 1004 is set so as to surround the display region of the bear character 30 included in the still image 1001 with a broken line.

FIG. 18 is referred to again.

As coordinate information defining this region 1004 (see FIG. 19), the position detection unit 901 outputs, for example, the coordinate values of the upper left corner, which is the starting point of the dragging, the number of pixels by which the mouse pointer 1002 moves in the vertical direction until the end of the dragging, and the number of pixels by which the mouse pointer 1002 moves in the horizontal direction until the end of the dragging.

The object detection unit 902 is used when an image to be used as an object is prepared in advance. The object detection unit 902 executes a matching process between the image data 14 (see FIG. 1) included in the JPEG file 10 (see FIG. 1) and the image of the object prepared in advance, and outputs the coordinate information for specifying the region in which matching is confirmed as position information.

The attribute information generation unit 903 executes a process of associating a description of a workflow process input through another screen or prepared in advance with each position information. Also, in this exemplary embodiment, the workflow process is described in the JSON format.

Figure 20A:
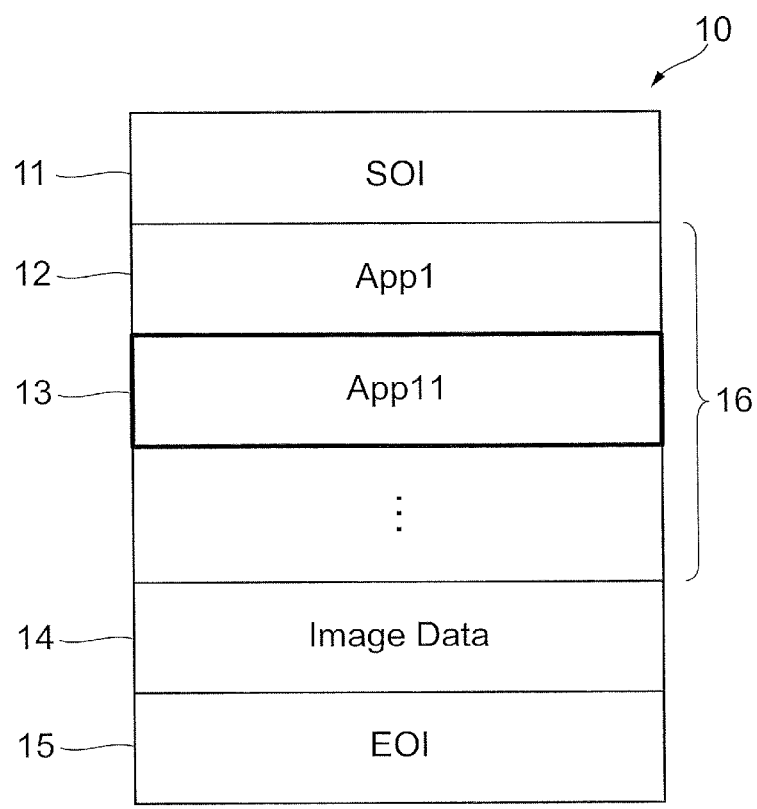
Figure 20B:
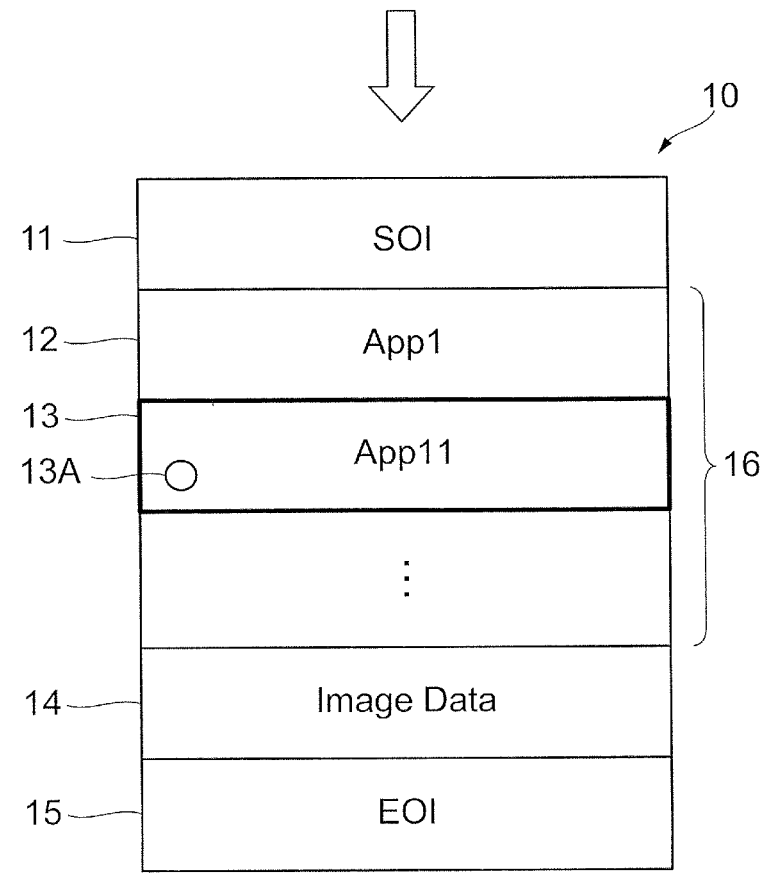

FIGS. 20A and 20B are views for explaining writing of information 13A that defines the workflow process into attribute information 16. FIG. 20A illustrates a data structure before the information 13A is included in the attribute information 16 of the JPEG file 10, and FIG. 20B illustrates a state in which the information 13A is added to the attribute information 16 of the JPEG file 10.

In this way, the information 13A defining the workflow process may be added to the existing JPEG file 10 later.

By writing, in the attribute information 16, the information 13A that defines the processing content (for example, the workflow process) desired to be executed by the information processing apparatus, which uses the JPEG file 10, by using the technology of the present exemplary embodiment, it is possible to easily manage the use history of the image corresponding to the object included in the JPEG file 10.

Other Exemplary Embodiments

The exemplary embodiments of the present invention have been described above. It should be noted that the technical scope of the present invention is not limited to what has been described in the above exemplary embodiments. It is also apparent from the recitations of the claims that various modifications or improvements to the above exemplary embodiments are included in the technical scope of the present invention.

For example, in the above-described exemplary embodiment, the JPEG file 10 of the still image has been presented as an example of an image file format. Alternatively, the image file format may be a vector image. Further, in the above-described exemplary embodiment, the description has been made of the case where the image file is compatible with the image format that handles two-dimensional images. Alternatively, the image file may be an image format that handles three-dimensional images.

In the above-described exemplary embodiments, a workflow process is recorded using the JSON format. Alternatively, the workflow process may be recorded in the format of sound data or a text format other than the JSON format. Also, the workflow process may be recorded in another file associated with the JPEG file 10. For example, when there is a limit on the data region allocated to the attribute information 16, the workflow process may be recorded in another file.

Here, when the workflow process is recorded in the format of sound data, the reproduction sound of the sound data may be analyzed to execute the workflow process. In this case, the sound data may be recorded as a combination of tone signals. Further, the workflow process may be executed by analyzing the frequency components and waveform patterns without reproducing the sound data.

In the above-described exemplary embodiment, the image corresponding to the object has been presented as an example of the image whose use history is to be managed. It should be noted that the image whose use history is to be managed is not necessarily limited to the image corresponding to the object and may be an image such as a photograph, a novel, a paper, a short poem phrase, a map, and a figure. Also, the use history includes secondarily created images.

In the above-described exemplary embodiment, the information on charge is associated with the use history. It should be noted that it is not always necessary to associate the information on charge with the use history. Further, even in the case of associating the information on charge, a use in which charging is incurred depending on the content of the contract related to the use and a use in which charging is not incurred may be provided. In addition, an amount of charge may be set on a basis of the number of times of use and the like.

In the above-described exemplary embodiment, the information related to the use is transmitted to a predetermined terminal (for example, the content server 300 (see FIG. 2)) every time the use occurs. Alternatively, the transmission of information related to the use may be executed only when a predetermined specific condition is satisfied (for example, when charging is accompanied).

In the above-described exemplary embodiment, the information related to the use of the object to be managed is transmitted to an external terminal. Alternatively, the storage device in its own apparatus may be a transmission destination.

In the above-described exemplary embodiment, the description has been made of the case where the transmission of the information related to the use of the image corresponding to the object is executed based on the information that defines the workflow process described in the information 13A. The information 13A may not be information that defines the workflow process. For example, the information 13A may be information for assisting the transmission of the information related to the use or information for instructing a program executable by an information processing apparatus that processes the image to transmit the information related to the use.

In the above-described exemplary embodiment, an object is generated every time a use is detected. Alternatively, the object may be generated by collectively using plural uses which occur within a predetermined period (for example, 10 minutes).

In the above-described exemplary embodiment, the use history is managed by the content server 300. It is also possible to combine a mechanism for comparing the use history before the use of an image is executed, and determining whether the use is a permitted use.

In the above-described exemplary embodiment, the example has been presented in which the number 601 indicating how many times the character 20 has been used, the date and time 602, the used device 603, the user 604, the content of use 605, and the charge 606 are recorded in the use history data 600 (see FIG. 6). An application program utilized for the use may be recorded. For example, it may be recorded whether the image is used by a presentation program or an image editing program. In this case, it is possible to designate a specific application program and manage a use status of the image. Of course, in this case, the information of the application program is also notified to another terminal from the computer 210 as the information 502 related to the use (see FIG. 5). Further, by using this mechanism, it is possible to distinguish and manage which specific character is used and by which application of which computer the character is used. For example, even for the same character, charging may be managed according to a combination of an application to be used and a computer to be used.

Further, in the use history data 600 (see FIG. 6), one item is recorded for one item. Alternatively, plural items may be recorded. For example, when the usage mode of the image of the character to be managed is duplicating, not only the device that receives the duplicating operation but also the device of the duplicating destination may be recorded. In addition, in a case where an image of a character is exchanged among plural application programs, an application program that receives the operation of the transmission source and an application program on the receiving side may be recorded.

In the above-described exemplary embodiment, the image of the character included in the still image file is managed. Alternatively, as described above, the character included in the moving image file may be managed. In this case, a use of the image may be managed by designating a specific scene (from a certain reproduction time to a certain reproduction time). Of course, the use of the image may be managed for each individual character or may be managed for each group.

In the above-described exemplary embodiment, the example of the combination of items included in the information 502 (see FIG. 5) related to the use of the image notified to another terminal by the terminal which uses the image is illustrated. It may be designated in the information 13A (see FIG. 1) which item is to be notified to another terminal as the information 502 related to the use of the image. By designating the item to be managed in a portion of the attribute information 16 (see FIG. 1) corresponding to a character to be managed, it is possible to freely change the item to be managed according to the character to be managed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive an image associated with attribute information, wherein the image is a JPEG file in compliance with JPEG format, the attribute information of the JPEG file comprises information related to a use of the image, the information related to the use of the image is information related to a usage mode;
transmit the information related to the use of the image through execution of a workflow process defined by the information related to the usage mode when detecting the use of the image, wherein the attribute information that defines the workflow process is described in a specific format capable of recording the information related to the usage mode;
decode a description in the specific format in the attribute information and initiates the workflow process;
record the usage mode of an object to be used in the image in response to the workflow process;
generate a block comprising the information of the usage mode and a hash value of an immediately preceding block; and
transmit the block to another information processing apparatus, so as to update a ledger database of the information processing apparatus and make the other information processing apparatus update a ledger database thereof after validity of a use history of the image is correctly handed over between the information processing apparatus and the other information processing apparatus is verified.

2. The information processing apparatus according to claim 1, wherein the image is an image corresponding to an object.

3. The information processing apparatus according to claim 2, wherein the image corresponding to the object is an image representing a character.

4. The information processing apparatus according to claim 1, wherein the information related to the use of the image is transmitted through execution of a workflow process defined by the attribute information associated with the image.

5. The information processing apparatus according to claim 4, wherein the attribute information that defines the workflow process is described in a JSON format.

6. The information processing apparatus according to claim 1, wherein the information related to the usage mode includes duplicating, modifying, printing, recording, transmitting, distributing, and broadcasting.

7. The information processing apparatus according to claim 1, wherein the transmitter transmits the information related to the use of the image by designating, as a destination, a device that manages a use history of the image.

8. The information processing apparatus according to claim 1, wherein the transmitter transmits the information related to the use to another apparatus connected in a peer-to-peer manner.

9. The information processing apparatus according to claim 1, wherein the transmitter accumulates the information related to the use of the image within the information processing apparatus.

10. The information processing apparatus according to claim 9, wherein
- when a communication with an outside is not possible, the transmitter accumulates the information related to the use of the image in the information processing apparatus, and
- when the communication with the outside is restored, the transmitter ansmits the information related to the use of the image to an external apparatus.

11. The information processing apparatus according to claim 1, wherein the information related to the use of the image is managed for each image corresponding to an object.

12. A non-transitory computer readable medium storing a program causing a computer to execute information processing, wherein the computer comprises an information processing apparatus, the information processing comprising:
- receiving an image associated with attribute information, wherein the image is a JPEG file in compliance with JPEG format, the attribute information of the JPEG file comprises information related to a use of the image, the information related to the use of the image is information related to a usage mode; and
- when detecting the use of the image, transmitting the information related to the use of the image through execution of a workflow process defined by the information related to the usage mode, wherein the attribute information that defines the workflow process is described in a specific format capable of recording the information related to the usage mode;
- decoding a description in the specific format in the attribute information and initiates the workflow process;
- recording the usage mode of an object to be used in the image in response to the workflow process;
- generating a block comprising the information of the usage mode and a hash value of an immediately preceding block; and
- transmitting the block to another information processing apparatus, so as to update a ledger database of the information processing apparatus and make the other information processing apparatus update a ledger database thereof after validity of a use history of the image is correctly handed over between the information processing apparatus and the other information processing apparatus is verified.

* * * * *